Oct. 11, 1938.   W. O. HAMPTON   2,132,686
SWITCHING DEVICE
Filed July 20, 1936    7 Sheets-Sheet 1

Inventor:
Weldon O. Hampton
By: [signature]
Atty.

Oct. 11, 1938.          W. O. HAMPTON                 2,132,686
                       SWITCHING DEVICE
                     Filed July 20, 1936           7 Sheets—Sheet 3

Inventor:
Weldon O. Hampton
By:
          Atty.

Oct. 11, 1938.  W. O. HAMPTON  2,132,686
SWITCHING DEVICE
Filed July 20, 1936  7 Sheets-Sheet 5

Inventor:
Weldon O. Hampton
By
Atty.

Oct. 11, 1938.  W. O. HAMPTON  2,132,686
SWITCHING DEVICE
Filed July 20, 1936  7 Sheets-Sheet 6

Inventor:
Weldon O. Hampton
By:
Atty.

Patented Oct. 11, 1938

2,132,686

UNITED STATES PATENT OFFICE 2,132,686

SWITCHING DEVICE

Weldon O. Hampton, Chicago, Ill., assignor to Delta-Star Electric Company, Chicago, Ill., a corporation of Illinois Application July 20, 1936, Serial No. 91,508

13 Claims. (Cl. 200—48)

This invention relates to switching devices in general, and is particularly concerned with a high pressure contact switch wherein I have incorporated numerous novel and improved features, thereby providing a switching device which is structurally new and which is actuated in a series of steps representing an improved method of operation.

Switches of the type disclosed herein are provided in conjunction with high tension lines, at switching, supply or terminal points, and are usually mounted on overhead truss and girder structures supporting the lines and associated station and switching equipment. A line may be connected to suitable terminals at two opposite points, and a switch blade may be provided so as to bridge the intervening space or line gap between these terminals whenever it is desired to connect the line for service.

One object of the invention relates to the provision of a new switch structure comprising, stationary insulating means for supporting line conductors and contact means thereon forming a line gap or switch gap, a spring beam blade for bridging this gap, and means for moving said blade into or out of connect position with said contacts while maintaining the blade during its movement in parallel relation to the axis or plane of the stationary contacts.

Another object is realized by the provision of a high pressure contact switch structure wherein a switch blade is caused to engage a plurality of stationary contacts with substantially equal pressure, the contacts being disposed on a common axis or in a common plane, but separated from each other and forming a switch gap to be bridged by said blade.

A further object has to do with the provision of a high pressure contact switch wherein a movable switch blade is arranged to engage stationary contacts in such a manner as to produce a torsional contact wiping action upon engagement, and also upon disengagement operation of the device.

Still another object is concerned with the provision of a contact switch device comprising stationary contact-carrying insulating stacks or columns, together with a switch blade or bar supported by an insulating stack which is rotatably mounted therebetween, whereby the switch blade may be rotated from a normal or disconnect position disposed at an angle of substantially 90° to the stationary stacks into actuated or connect position with the blade bridged across the gap between said contacts carried on said stationary stacks.

A further object is realized in connection with the structure noted in the foregoing paragraph, by the provision of means for mounting the rotatable stack comprising a lever system whereby the movable stack and the switch blade may be actuated in a compound motion composed of rotation relative to the stationary stacks and, in addition thereto, a substantially straight line motion in the direction of its own axis, the sequence of said motions being alternate according to the connect or disconnect operation of the device, whereby the switch blade may be connected to and disconnected from the stationary contacts, respectively, so as to produce upon contact making and also upon contact breaking a high pressure wiping action.

Still another object refers to a switch structure having the stationary contact-carrying stacks and a movable stack carrying the switch blade or bar, wherein the blade is mounted on the movable stack by means of a jointed racking device which is biased in a normal direction and causes a torsional contact wiping action upon engagement as well as disengagement of the switch blade relative to the stationary contacts.

Another object has to do with the provision of a switch structure of the previously defined class, wherein a switch blade is mounted movably on a movable stack and provided with contacts adapted to engage stationary contacts, the engagement and disengagement, respectively, of the movable contacts with the stationary contacts being attended by high pressure wiping action.

Other objects refer to structural details; to the adaptability of my invention for remote controlled or for gang operation; and to the new method or mode of operation which results from the new structure. These and additional objects not yet mentioned will be clearly brought out in the following detailed description which is rendered below with reference to the drawings. In these drawings.

Like parts are numbered alike in each of the drawings illustrating the above noted embodiments and their detail parts.

Referring, now, particularly to Figs. 1–6, inclusive, the switch device shown therein comprises two stationary insulating columns or stacks designated by numerals 11 and 12. These stacks are mounted on sockets 13—14, respectively, disposed on a base 15 which may be composed of suitable girder portions particularly indicated in Figs. 2 and 3 by the reference numerals 16—17. This base, in turn, may be mounted on a truss portion indicated in Figs. 2 and 3 at 18.

Figures 2, 6:
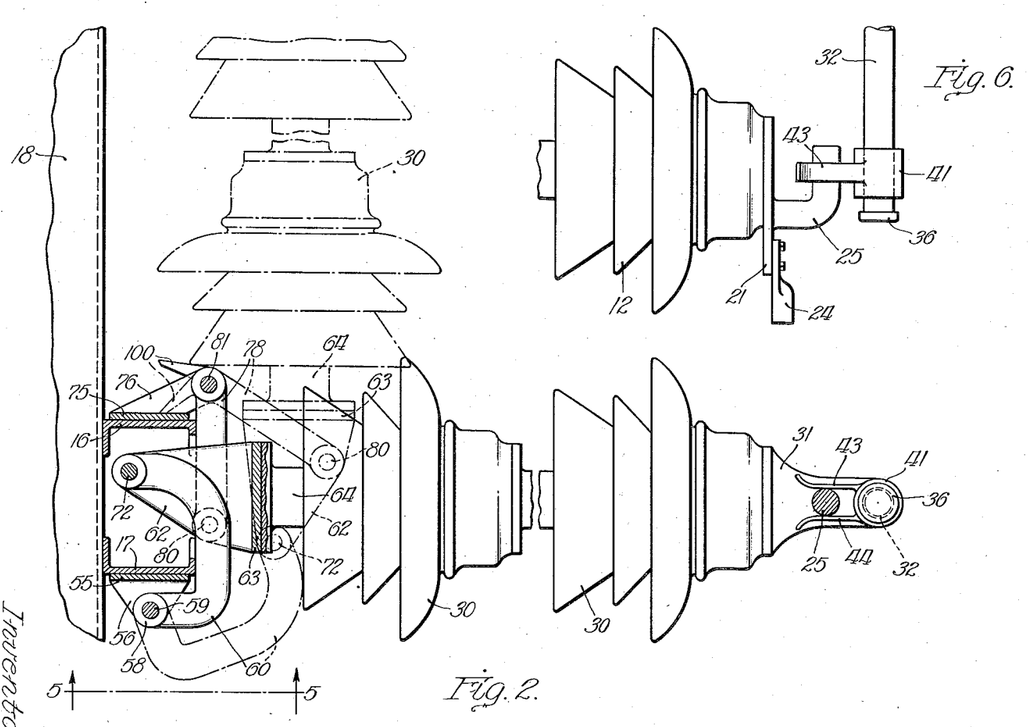
Fig. 2 represents a side view of the device taken on line 2—2 of Fig. 1, showing the movable stack and the switch blade thereon in connect position, and also indicating the movable stack in disconnect or normal position in dot-dash lines.
Fig. 6 shows on an enlarged scale one end of the switch blade or bar connected with the stationary contact on one of the stationary insulating stacks carrying a line terminal.
Figures 10, 11, 12:
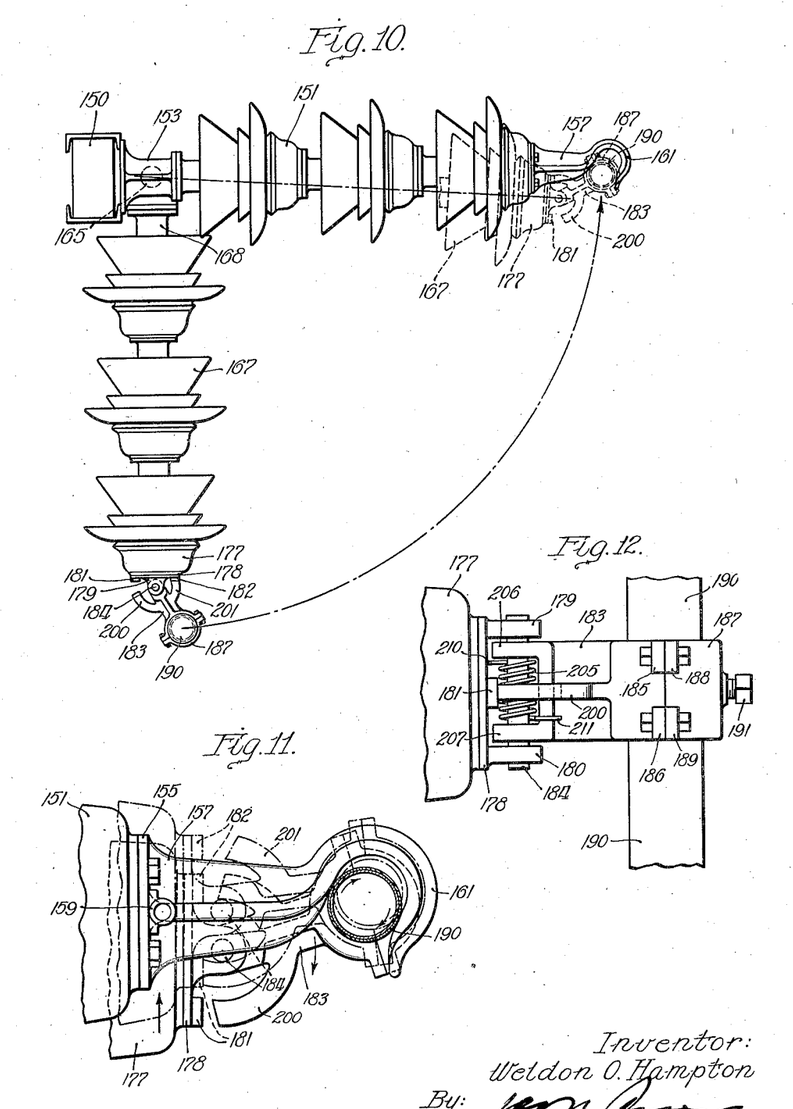
Fig. 10 is an end view of the modified device shown in Fig. 9.
Fig. 11 is an enlarged view of the switch blade mounted as shown in Figs. 9 and 10, and illustrating its motion and its torsional wiping action with relation to the stationary contacts.
Fig. 12 illustrates an enlarged front view of the toggle joint whereby the switch blade or bar shown in Figs. 9–11, inclusive, is mounted on its movable stack.

At the end of each of the stationary stacks or insulating columns 11 and 12 are mounted the connectors 20 and 21, each of which carries a terminal, such as indicated at 22 and 24, and contacts, such as 23 and 25, respectively. The particular structure is well shown in Fig. 6 illustrating part of the stationary insulating column 12 with the connector 21 carrying the terminal lug 24 and the contact 25. The line which is to be served by this device may be connected to the terminal lugs 22 and 24, respectively, and, inasmuch as each terminal lug is conductively related to its corresponding contact, it will be realized that conductive relation is established between the contacts, such as 23 and 25, and the line connected to the terminal lugs 22 and 24. Each of the contacts 23 and 25 may consist merely of an angular metallic member circular in cross-section and relatively rigidly and permanently mounted on the corresponding stationary insulating columns, as shown. It will be clear, therefore, that I have provided a line or switch gap comprising the two oppositely located stationary line contacts or yokes, such as 23 and 25, which are disposed on a common axis. This particular feature may be changed if desired. It is possible, e. g., to employ contacts or yokes which extend in a direction coaxial with or parallel to the axes of the supporting stacks, or which are even disposed at an angle to the axes of the stacks. In either case, however, the contacts or contact yokes will be in a common plane. The use of the term "axis" or equivalent language is therefore intended to include the meaning of the term "plane" or its equivalent.

Figure 1:
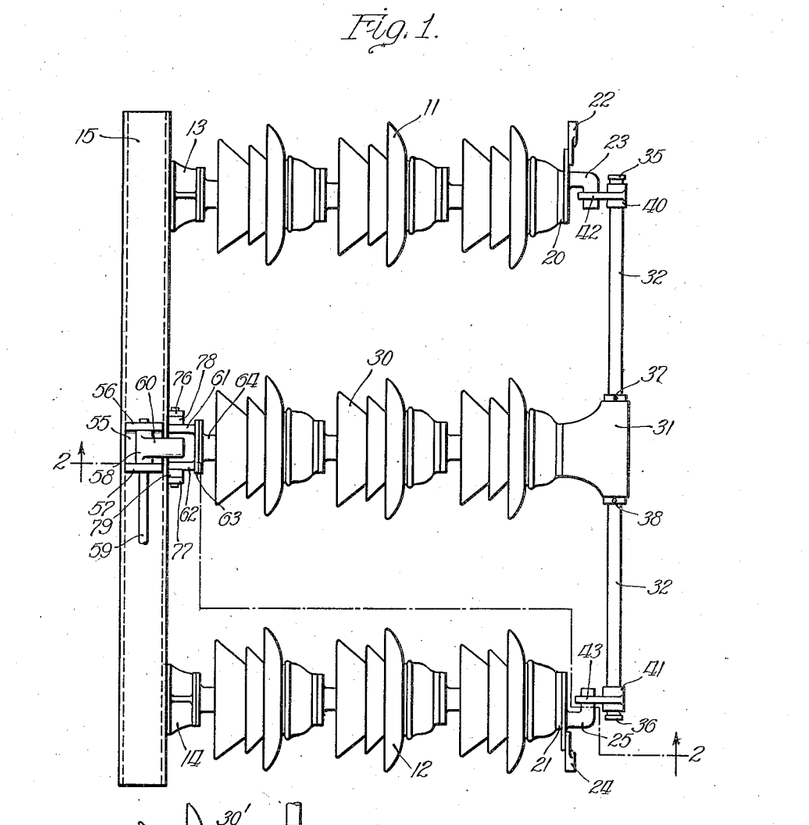
Fig. 1 shows a side view of one embodiment of my new switch device employing the movable stack carrying a switch blade at one end and being mounted on a lever system which produces the compound motion noted previously.

Midway between the stationary insulating columns or stacks 11 and 12 is a movable insulating column or stack 30, as is particularly shown in Fig. 1. This stack is mounted movably with relation to the stationary stacks 11 and 12, and its movement proceeds in a compound motion produced by means of a lever system which I will presently describe in detail. At the free end of the movable stack 30 is secured a connector 31 carrying the new spring beam switch blade or bar 32.

Figure 13:
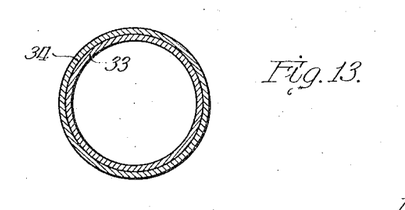
Fig. 13 is a cross-section through the new spring beam switch blade or bar employed with my device, showing its tubular structure.

This switch blade may be of any suitable structure, but I prefer to use the embodiment particularly illustrated in Fig. 13. It comprises a seamless steel tubing 33 carrying on the outside a hard-drawn copper tubing 34. Each end of the blade 32 is sealed and closed by a cap, such as shown at 35 and 36, in order to prevent the ingress of moisture into the interior thereof.

I have diagrammatically indicated in Fig. 1 that the switch blade 32 is carried by the connector 31 and firmly attached thereto by means of the screws 37 and 38. It is understood, of course, that this is only a diagrammatic showing and that the connector 31 may in reality be constructed differently. For example, it may consist of a mounting member directly connected to the movable insulating stack and provided with suitable flanges and a hollowed center portion for receiving the switch blade, together with a hollowed companion cover member also provided with flanges for attachment to the flanges on the mounting member. The blade 32, regardless of the particular manner in which it may be mounted in practice, is in relatively firm and rigid engagement with the connector 31 and, therefore, with the movable stack 30. In other words, the blade is so secured that it cannot rotate within its mounting.

Near each end of the blade 32 and firmly secured thereon are bushings, such as 40—41 shown in Fig. 1, each of which carries clip-like flaring contact members, such as 42—43. These contact members are particularly shown in Figs. 2, 3 and 6 at 43—44.

Figure 3:
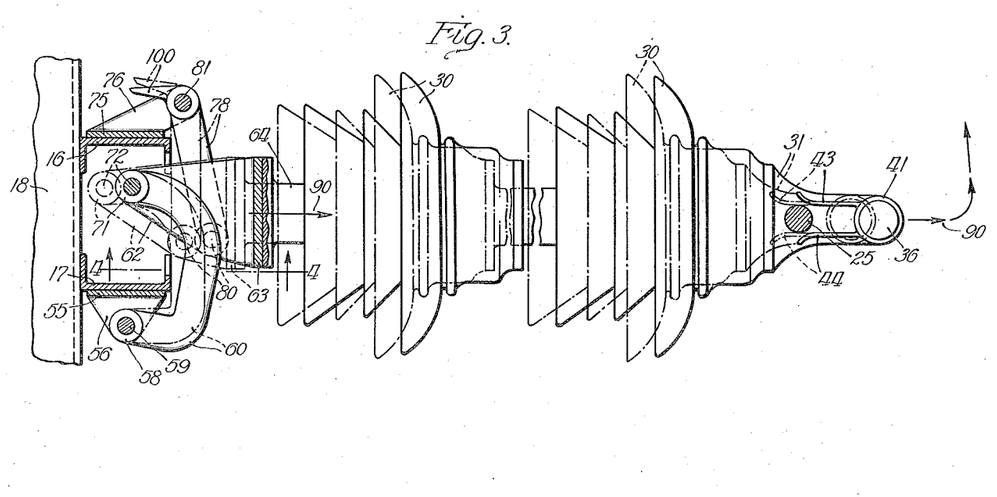
Fig. 3 illustrates a view similar to the one shown in Fig. 2, except that the movable stack is shown with the blade in partial disconnect position just after the straight line motion of the stack is completed and prior to the swinging or rotating motion of the movable stack.

The device is shown in Figs. 1, 2 and 6 in connect position with the switch blade 32 bridging the line gap between the contacts 23—25. In Fig. 3 the device is shown in partial disengaged position at the conclusion of one of the compound motions produced by the lever system on which the movable stack 30 is mounted.

Figure 7:
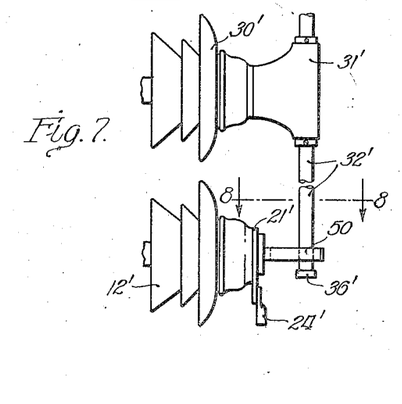
Fig. 7 illustrates an alternate structure of a switch blade or bar in conjunction with alternate contact means on the stationary stacks.
Figure 8:
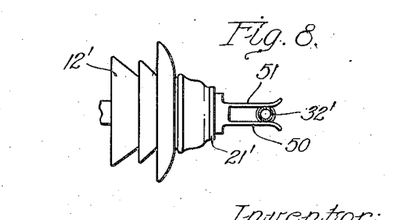
Fig. 8 is a view of the contact means and switch blade taken on line 8—8 of Fig. 7.

Instead of employing the contact provisions described above in connection with the blade 32, as is particularly shown in Fig. 6, it is possible, of course, to use another arrangement, e. g., such as indicated in Figs. 7 and 8. Numeral 12' in these figures indicates part of a stationary stack, such as the one shown at 12 in Fig. 1. Numeral 30' is a movable center stack with its connector 31' carrying the blade 32' which is attached firmly to the connector and closed at each end by a cap, such as the cap 36'. No contacts are directly attached to this blade, but, instead, a connector such as 21' is provided on each of the stationary stacks, and each connector carries a terminal lug, such as 24', and a forked flaring contact yoke having branches 50—51, as is particularly shown in Fig. 8. In this particular structure the stationary contacts are again disposed on a common axis. However, as previously noted, other embodiments are possible wherein the term "plane" might properly be used in lieu of the word "axis". Either term is appropriate in the general sense and meaning.

I will now describe the lever system on which the above noted movable stack and switch blade of my invention are mounted; the explanations appearing below are rendered particularly with reference to Figs. 1-5, inclusive.

On one side of the truss structure forming the base 15 is provided a generally U-shaped bracket 55 having the legs 56—57. Rotatably mounted in this bracket by means of the bearing portion 58 is a lever arm 60 secured to the shaft 59. This lever arm enters between the legs 61—62 of a mounting member 63 to which is attached the pin 64 of the rotatable stack 30. The other end of the lever arm 60 is also provided with a bearing portion or suitable bushing means, as is particularly indicated in Fig. 4 by the numerals 70—71, and this end is pivotally mounted between the legs 61 and 62 of the mounting member 63 by means of the bearing pin 72.

On the other side of the truss structure 15, as is particularly shown in Figs. 2 and 3 in connection with the truss member 16, is provided another generally U-shaped bracket having the cross portion 75 and the arms 76—77. Mounted on these arms are links 78—79, respectively, and these links engage the legs 61—62, respectively, of the mounting 63 of the rotatable stack 30 from the outside and are pivoted thereto by means of two bearing studs, such as 80. These links are also pivotally mounted between the arms 76—77 by means of the pin 81.

It will be seen from the above description, particularly when looking at Fig. 2, that the movable insulating stack 30 carrying the switch blade 32 is thus mounted on the supporting system comprising the central operating lever 60 and the two links 78—79. The operating lever 60 is disposed between the legs 61 and 62 of the bearing member 63 carrying the insulating stack 30 (and is pivotally secured thereto by means of the pin 72) while the links 78 and 79 engage the legs 61 and 62, respectively, from the outside thereof (being pivotally secured thereto by means of studs 80). The lever 60 and the links 78 and 79 are also pivotally mounted on the truss structure by means of the shafts or pins 59 and 81, respectively.

In connect position, as shown in Fig. 2 in full lines, the insulating stack 30 will be disposed between the stationary stacks 11 and 12 with its axis in parallel with these stationary stacks. The lever 60 in its center portion will rest on the cross bar of the truss member 17, and the links 78 and 79 in their center portions will rest on the oppositely located cross portion of the truss member 16. The rotatable stack 30 will thus be in firm physical engagement with the supporting structure and the forked contacts having the members 43 and 44 attached by means of the bushings 40—41, respectively, to the switch blade 32 will be in high pressure engagement with the contacts 23 and 25, respectively. The switch device is thus in operated or connect position, and the switch blade 32 bridges the switch gap between the contacts 23 and 25, being disposed parallel to the common axis or plane of the contact members or yokes and, in a sense, parallel to the line conductors which are connected to the terminal lugs 22 and 24, respectively. The same condition will prevail in case a switch blade and contact yoke structure is employed, such as indicated in Figs. 7 and 8.

When it is desired or necessary to interrupt the connection or continuity of the line, the device will be actuated by rotating the operating shaft 59, which may be controlled from a gear box suitably located and governed, and the operating lever 60, which is keyed to the operating shaft 59 by means of its bearing bushing 58, will then be progressively rotated into the dot-dash disconnect position shown in Fig. 2. The links 78 and 79 will follow the movement around their pivot points on the shaft 81 and will finally assume the dot-dash position shown in Fig. 2. At that time the stack 30 will also be in its dot-dash position, which is the complete disconnect position, and will then be disposed at an angle of substantially 90° to the axis of the stationary stacks 11 and 12.

Figure 4:
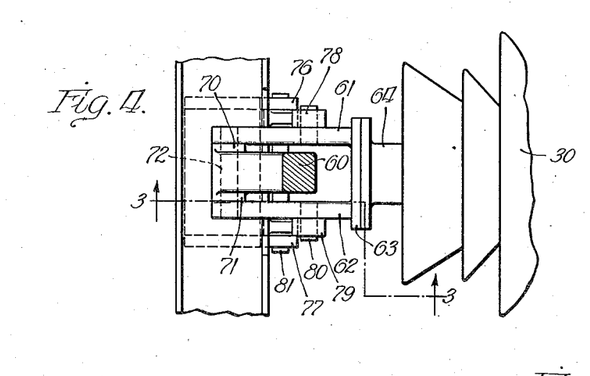
Fig. 4 is an enlarged fragmentary view of the device, partly broken away and in section, taken along the line 4—4 of Fig. 3.
Figure 5:
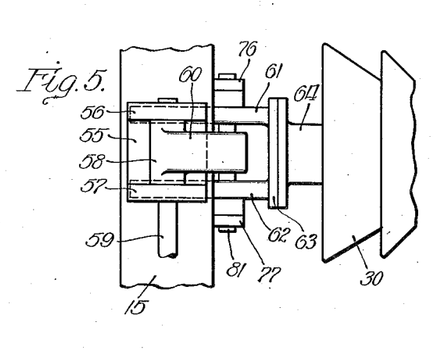
Fig. 5 is an enlarged fragmentary front view of the device, with parts broken away, as seen along the line 5—5 of Fig. 2.

As has been noted previously, the above described disconnect motion of the movable stack 30 is a compound motion whereby the movable stack will be moved, first in a direction substantially parallel to its own axis, and particularly along the line of the arrows numbered 90 shown in Fig. 3. During this initial movement the flaring contacts of the contact yokes secured to the switch blade 32 will move away from the contacts 23 and 25 in a substantially straight line and finally will leave these contacts. Figs. 3 and 4 show the device in full lines at that moment of the compound motion. It will be seen that the lever 60 and links 78—79 are slightly raised from their dot-dash (connect) positions, having raised the mounting member 63 and the movable stack 30 into the full line position and having brought about the disengagement of the contacts on the switch blade 32 from the stationary contacts 23 and 25.

Upon continued rotation of the operating shaft 59 the lever 60 and links 78—79 will continue to move toward their terminal positions shown in Fig. 2 in dot-dash lines, and the lever 60 will begin to rotate the mounting member 63 with increasing velocity about the axis of studs 80, thus tilting or swinging the stack 30 sideways. The movable stack will finally reach its dot-dash position shown in Fig. 2. Limit or stop members 100 are provided on the links 78 and 79. These stop members will rest against the wall 75 of the U-shaped bracket secured to the truss member 16 and supporting the links 78—79 which are pivoted at 81. It will, therefore, be clear that the movable stack will again be securely resting in its normal or disconnect position in firm engagement with the supporting truss structure.

The flaring contact members 42, 43 and 44 projecting from the bushings, such as 40—41, which are attached at the ends of the blade 32, determine the pressure with which the blade 32 is conductively connected to the line contacts 23 and 25. It will be understood that the combined pressure which can easily be produced by the provision of two such contact members or, rather to say, by the provision of two places where the blade engages stationary contacts, will be a multiple of the pressure that could possibly be produced in the case of a switch device which has only a single contacting point or contact position.

Referring now again to the compound motion of the movable stack 30 determined by the supporting system 60, 78—79, this motion during the disconnect operation, as above described, proceeds initially substantially in the direction of the arrows 90 in Fig. 3, and then continues in a rotating motion swinging angularly away from the stationary stacks until the normal position shown in dot-dash lines in Fig. 2 is reached. At any time during this motion the switch blade 32 will be substantially in parallel relation to the axis of the stationary contacts 23—25, as previously mentioned.

The operation of the device into connect position proceeds in the reverse order. The shaft 59 will be rotated to move the operating lever 60 from its dot-dash position in Fig. 2 into its full line position. In view of the fact that the links 78—79, which are pivotally supported at 81 on the truss structure, are also pivotally connected at 80 to the legs 61—62 of the mounting member 63 of the movable stack 30, it will be clear that during this motion the stack 30 will be raised from its dot-dash position in Fig. 2 into its full line position, until a point is reached substantially as indicated in full lines in Fig. 3. The flaring forked contacts 43 and 44 and like contacts at the other end of the blade 32 are at this moment not yet in engagement with the corresponding stationary contacts 23 and 25. When the connect or operating motion is continued, due to a continued rotation of the operating shaft 59, the movable stack 30 will enter its second movement substantially in the direction of its own axis, thereby causing the engagement of the pairs of forked contacts, such as 43—44 on the blade 32, with the corresponding stationary contacts 23—25. The engagement will proceed with progressive force due to the pressure that will be increasingly caused by the progressive engagement of the contacts on the blade with the stationary contacts. The flaring contact arms 42, 43—44 on the blade 32 will rub and wipe along the stationary contacts until the fully engaged position is reached, as shown in full lines in Fig. 2. Any grit deposited on the stationary contacts will thereby be removed, and the contact points will be automatically wiped clean.

The contact engagement and disengagement action will be substantially the same as above described in case a contact and blade structure is used, such as shown in Figs. 7 and 8. In this case the blade 32′ is not provided with any contacts, but, instead, the connector, such as 21′, on each of the stationary insulating stacks, such as 12′, carries flaring forked contact yokes or contacts, such as 50 and 51.

In case of individual switch operation or remote controlled operation, suitable operating levers may be connected to the corresponding shaft 59 of each switch unit. These levers may then be actuated from a suitably located gear box or by means of connecting rods disposed between the actuating mechanism, e. g., gear box, and the corresponding switch unit. In case of gang operation, the operating shaft 59 may extend from one switch unit to the other and through or along the channel structure of the truss supports shown at 16 and 17 in Figs. 2 and 3, and the operating lever may then be located at the end of the channel, thus obviating a gear box for each individual unit. If remote controlled gang operation is desired, the operating shaft may be connected to a suitable worm gear mechanism which, in turn, may be controlled from a remotely located gear box. If desired or necessary, particularly in case of very heavy structures, it will be advisable to provide a counterweight cooperating with the movable stack of a switch unit so as to obtain a smooth and easy operation and using at the same time relatively little power.

Whereas in the above described embodiment shown in Figs. 1–8, inclusive, I have provided for a compound movement of the blade by means of the lever system on which the movable stack is mounted, in the embodiment now to be described, shown in Figs. 9–12, inclusive, I provide for the compound motion of the switch blade or bar separately by means of a rocking mechanism interposed between the blade mounting and the movable supporting stack which is mounted rotatably on the base between the stationary stacks in a manner previously described. I will now explain this latter embodiment in detail with reference to Figs. 9–12, inclusive.

Numeral 150 indicates, generally, a suitable base which may be suitably mounted on the corresponding truss structure. This base supports a stationary stack 151 and another stationary stack 152 which are mounted thereon, as indicated at 153 and 154. Each of these stacks carries at its upper end a mounting member 155 and 156, respectively, which, in turn, supports a contact yoke, such as indicated at 157—158, and also line terminal lugs 159 and 160, respectively. Each of these contact yokes consists of an upright member having a hook-like flaring contact portion, these contact portions being indicated in the drawings at 161 and 162, respectively.

On the base 150 are mounted housings 163 and 164 containing roller and thrust bearings supporting a shaft 165 upon which is mounted a bearing casting 166. This casting, in turn, supports the centrally located movable stack 167 which is secured thereto by means of the pin member 168. The bearing casting 166 is on both sides provided with octagonal shanks, indicated at 170—171, for receiving a clamp type adjustable lever arm, such as shown at 172. Of course, these shanks may merely be roughened or knurled for attachment of a suitable clamp lever arm. This lever arm extends into the channel of the base 150 and in the side of this base are openings, such as shown at 175, provided for the purpose of attaching operating members 176 to the operating lever, such as 172. There may be a suitably located gear box or the like controlled locally or remotely, as the case may be, and governing the operation of a shaft, such as 176, in a direction, for example, perpendicular to the plane of the drawings Fig. 9. When such operation occurs, then it will be clear that the lever 172 will rotate and will carry along and rotate the bearing casting 166 mounted on the shaft 165 which is journalled in the roller-thrust bearing housings 163—164 and, inasmuch as the stack 167 is attached to the bearing casting 166, this stack will be rotated perpendicular to the plane of the structure, as shown in drawing Fig. 9.

The rotatable stack 167 carries at its upper end a mounting member 177 to which is attached a base 178 carrying ears 179—180 and bosses projecting therefrom indicated at 181—182. Pivotally mounted on the bearing pin 184 between the ears 179 and 180 is the mechanism 183 comprising a casting having flanges 185—186 at one end and a companion casting 187 having companion flanges 188 and 189 and forming with the upper portion of the casting 183 a mounting for the switch blade 190. This blade may again be a spring beam blade, such as the one described in connection with the previous emmbodiment and particularly shown in cross-section in Fig. 13. Secured to the top clamp casting 187 may be a screw, such as indicated at 191, for the purpose of securely maintaining the blade 190 against rotation within the clamp mounting shown. The ends of the blade 190 may again be sealed by means of caps 195—196, so as to prevent the ingress of moisture into the interior of the blade.

The clamp casting 183 of the blade-carying mechanism carries on each side a limit stop, such as indicated by the reference numerals 200 and 201. It will be seen from the drawings that the limit stop 200 is adapted to operate against the boss 181 on the mounting member 178, while the limit stop 201 is adapted to cooperate with the boss 182. A spring member 205 is disposed between the ears 206—207 of the casting 183 and is coiled around the bearing pin 184 engaging at one end 210 the base of the mounting member 178 and at its other end 211 the edge of the center portion of the casting 183, as is particularly shown in Figs. 9 and 12. This spring thus forces the blade-carrying mechanism to one side with the limit stop 201 engaging the boss 182, as indicated in Fig. 10. In other words, the blade-carrying mechanism is normally biased to assume the position on the movable stack 167, as is shown in Fig. 10. The axis of the blade 190 is out of alignment with the center line or axis of the movable stack, and the blade is thus held in normal position against inertia and gravity.

When the movable stack 167 is rotated from its disconnect position shown in full lines in Fig. 10 into its connect position with the spring beam blade 190 in engagement with the stationary yokes or contacts 161—162, there will initially be merely a rotation of the stack in the direction of the stationary stacks 151—152. The spring beam blade in its biased position, as shown in Fig. 10, will be carried to a point which is below or out of alignment with the common center line or axis or plane of the stationary contacts 161—162. At the moment when the stack 167 assumes the position shown in dotted lines in Fig. 10, that is, at the moment when the spring beam blade encounters the stationary contacts 161—162, further rotation will be carried through against the resistance created by the progressive engagement of the spring beam blade with the contacts 161—162. The joint interposed between the blade and its supporting stack will gradually and progressively straighten against the force of the biasing spring 205. In other words, the blade-carrying mechanism will rotate around its pivot pin 184. The limit stop 201 will leave the boss 182 and the limit stop 200 will move toward and against the boss 181. The mechanism is shown in this position in Fig. 11.

During the above described operation, that is, from the moment when the spring beam blade encounters the stationary contacts 161—162 to the moment when it has fully entered the stationary contacts, the spring beam blade, due to the rotation of its support around the pivot pin 184, will execute a rotary movement against the corresponding friction surfaces of the yokes or contacts 161—162. This movement is indicated by the arrows in Fig. 11. It is a torsional wiping movement, and the contact surfaces will thereby be wiped clean and the spring beam blade will enter into firm high pressure contact with the stationary contacts 161—162. The joint will finally reach its alternate position with the limit stop 200 engaging the boss 181, and the final rotary movement of the stack 167 will merely press the blade 190 into its ultimate position within the stationary contacts.

When disconnection is desired, the movable stack 167 will be rotated in the reverse direction. The blade 190 is held in firm high pressure contact with the stationary contacts 161—162 when the disconnect operation is initiated. Accordingly, the pressure will be relieved first, and the reverse operation from the one described above will take place.

The above described torsional wiping action of the blade 190, upon engagement with and also upon disengagement from the stationary contacts 161—162, is in this latter embodiment clearly determined by the action of the toggle joint interposed between the blade 190 in conjunction with the rotary action of the movable supporting stack 167.

The embodiment above described, and shown in Figs. 9-13, inclusive, is in other functional respects similar to the one described in connection with Figs. 1-8, inclusive.

In Figs. 14-18 is shown a further embodiment of my invention wherein I provide a movable stack carrying a movable switch blade provided with contacts adapted to engage stationary contacts supported on stationary stacks in a high pressure wiping action so as to establish high pressure contact in a plurality of contacting points.

Figure 9:
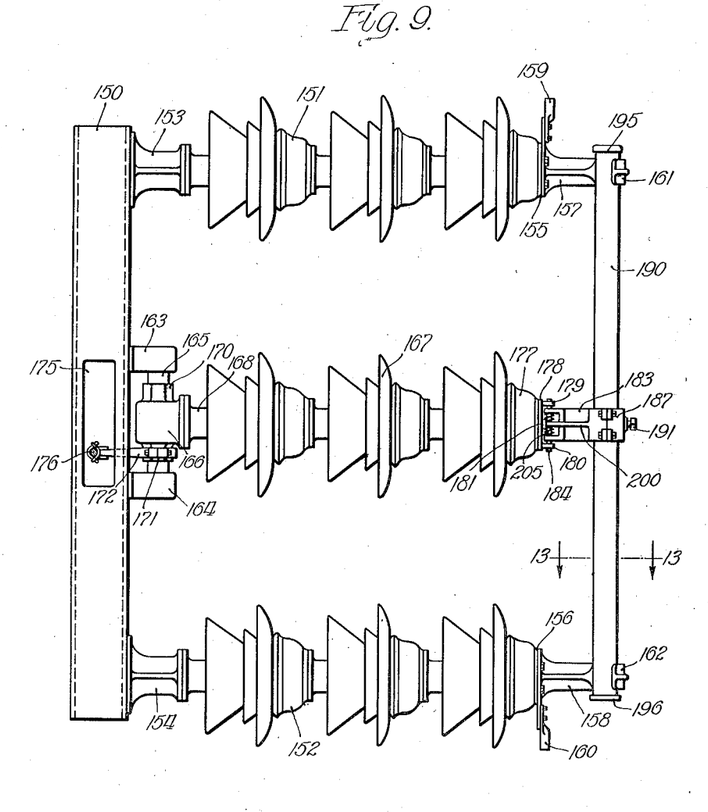
Fig. 9 represents a view of a modification corresponding in outlay to the view of the device shown in Fig. 1.
Figure 14:
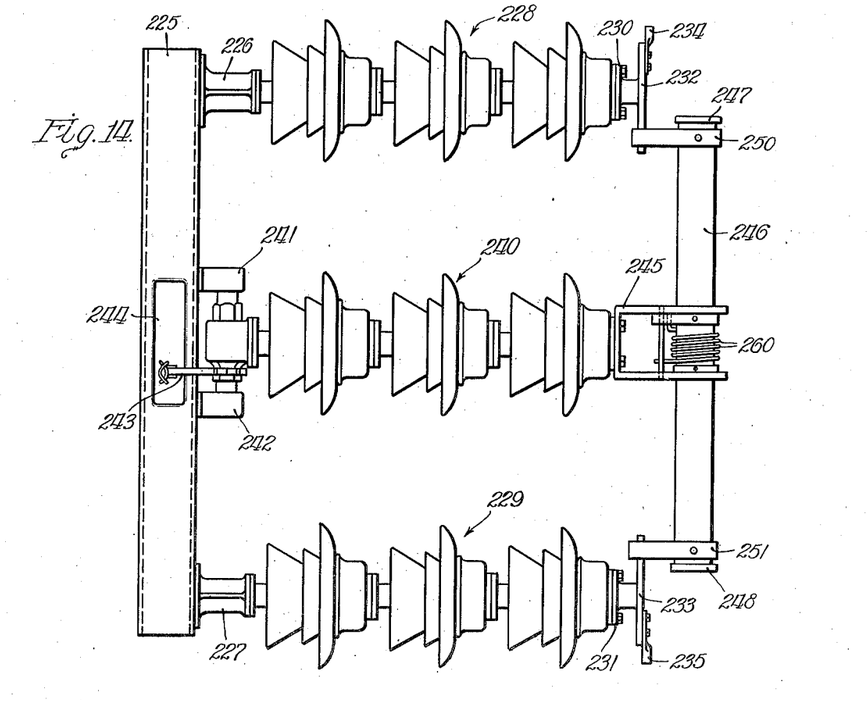
Figs. 14 and 15 illustrate two views of a further embodiment wherein the switch blade is mounted movably on a movable or rotatable stack.
Figures 15, 17, 18:
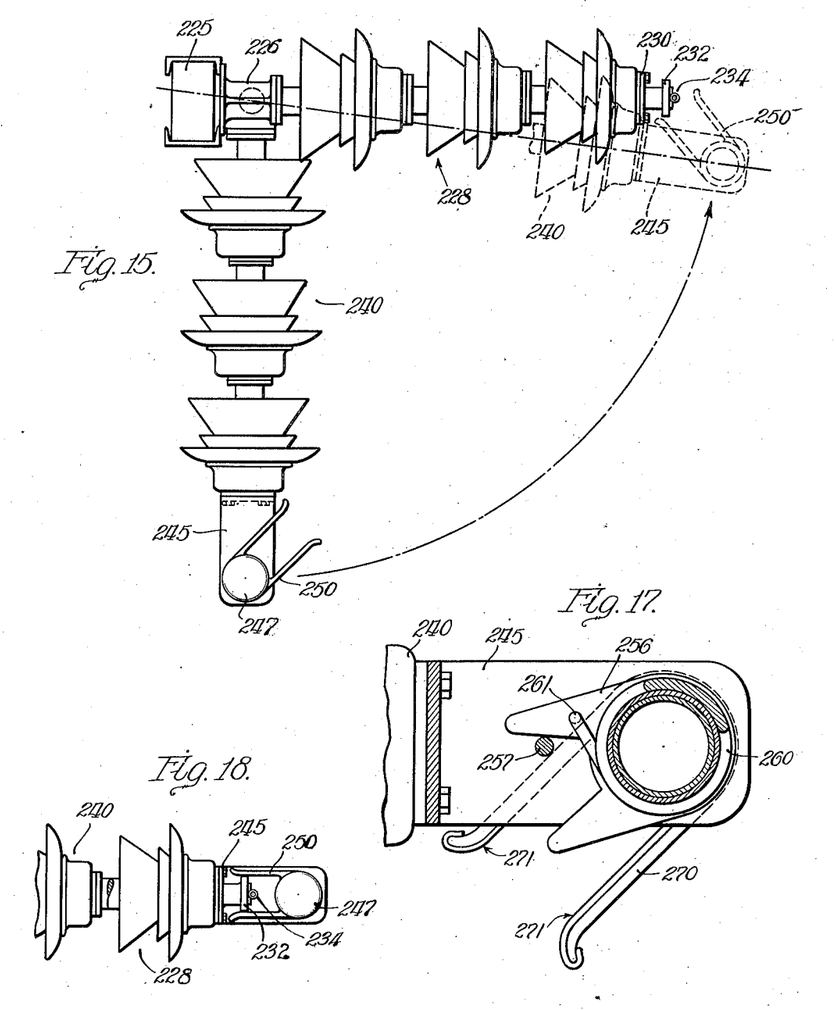
Fig. 17 represents a sectional view of the blade mounting and biasing means taken along the line 17—17 in Fig. 16.
Fig. 18 is a fragmentary view showing the full connect position of the device illustrated in Figs. 14–17.

Figs. 14 and 15 show two views of this particular embodiment corresponding somewhat in outlay to the views of the previously described modification shown in Figs. 9 and 10, respectively. Numeral 225 represents the base of this structure which may be part of or may be attached to the girder and truss structure of the entire installation, as previously noted. Carried on this base by means of sockets 226—227 are the stationary stacks indicated at 228—229, respectively. Each of these stationary stacks supports a connector, such as indicated at 230—231, each in turn carrying a contact, as shown at 232—233, respectively. These contacts are made in the form of contact blades rectangular in cross-section, and secured to each is a terminal lug, as shown at 234—235, for the attachment of the corresponding line conductors. Thus the stationary contacts are again disposed in a common plane in the sense previously mentioned.

The center stack or rotatable stack 240 is again movably or rotatably supported in the mounting or bearing brackets 241—242 and provided with a lever, such as 243, the end of which may project into the opening 244 in the base 225 so that the stack 240 may be rotated with respect to the stationary stacks 228—229 upon moving the operating lever 243 as previously described.

Mounted on the stack 240 is the bracket member 245 for rotatably supporting the blade or tubular contact member 246 in a manner which will presently be described. Each end of the contact member 246 is again closed, as indicated at 247—248, for preventing the ingress of moisture. At each end of the contact member 246 is provided a forked contact element, as indicated at 250—251. Inasmuch as the entire contact blade or beam 246 is rotatable within the bracket 245, it will be understood that, responsive to the rotation of the movable stack 240 with respect to the stationary stacks 228—229, a displacement of forked contacts 250—251 will be caused, with the result that the forked contact members engage the stationary contacts 232—233 or disengage therefrom in a high pressure wiping action.

Examining, for example, Figs. 14 and 15, the latter showing the movable or rotatable stack 240 in full lines in disengaged position (disposed at an angle of 90° relative to the stationary stacks 228—229) and in dotted position fragmentarily just prior to the conclusion of the connect movement, it will be seen that the forked contact 250 is in a biased or tilted position relative to the stationary contact 232 (and, of course, the oppositely located forked contact 251 (Fig. 14) is at this moment in the same biased or tilted position relative to the stationary contact 233), and if the connect movement of the movable stack 240 continues in the direction shown by the arrow in Fig. 15, it is clear that the edges of stationary contacts, such as 233, will be engaged first by the corresponding branches of the forked contacts, such as 250, and if the connect movement persists, the forked contacts will straighten out gradually, engaging the stationary contacts with a determined high pressure wiping action until the full connect position is reached, as indicated in Fig. 18, showing the forked contacts 251 in full engagement with the stationary contact 233. Both branches or forks of each of the contact members 250, 251 are now straightened out with respect to the stationary contacts 232—233.

Figure 16:
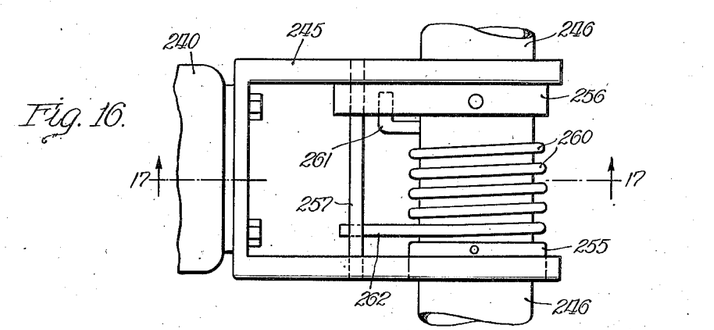
Fig. 16 is an enlarged front view of the mechanism for mounting the switch blade shown in the embodiment Figs. 14–15.

The normal bias or angular position of the forked contact members 250—251 attached to the blade or beam 246 is accomplished by means of a spring device, as is particularly illustrated in Figs. 16 and 17. The mounting bracket 245 is carried on the movable stack 240, as previously discussed, and is provided with oppositely located openings wherein the contact blade or beam 246 is inserted and able to rotate. The beam may again be of the same tubular structure as previously mentioned; for example, it may be a steel reinforced copper tubing rotatably placed within the openings or within suitable bearings in the legs of bracket 245. Numeral 255 is a bushing member secured on the blade or beam 246 within the legs of the bracket 245, as shown in Fig. 16. A control or limit stop member 256 is placed on the contact blade or beam within the legs of the bracket 245 opposite the bushing 255. The member 256 has two legs, as is particularly shown in Fig. 17, so as to limit the rotation of the contact beam or blade within the bracket 245 by engagement of either one of the legs of limit member 256 with the rod or pin 257 provided within the bracket 245 and connecting both legs thereof. When the leg of limit stop 256 is in engagement with the rod or pin 257, as shown in Fig. 17, the contact blade or beam 246 will be positioned so that its forked contacts at either end are tilted with respect to the center line of the rotatable stack, as shown in Figs. 15 and 17. When the other leg of the control or limit member 256 engages the pin 257, the legs of the forked contacts on the switch blade or beam will be in connect position, that is, substantially parallel to the center line of the rotatable stack 240, as indicated in Fig. 18.

The switch blade or beam 246 and its forked contacts 250—251 are normally maintained in the biased position with the contacts at an angle (Figs. 15 and 17), due to the provision of a spring 260 coiled around the contact beam 246 within the bracket 245 and between the members 255—256, one end 261 of the spring engaging one leg of the limit member 256 (Fig. 17), and the other end 262 of the spring pressing against the stop pin or rod 257 (Fig. 16).

Each of the forked contacts 250—251 mounted on the rotatable contact blade or beam 246 may be made of steel spring material, indicated in Fig. 17 by numeral 270, carrying a copper lining 271 in order to secure good electrical contact with the stationary contacts 232—233.

The last described embodiment of my invention is in functional respects also similar to the previously described device.

Changes may be devised if desired or required by any given conditions, but it will be understood that such changes are within the scope of the invention, and any change or embodiment that may fall within the spirit and scope of any or all of the appended claims is, therefore, to be considered my invention.

I claim as my invention:

1. A high tension switch, a pair of fixed insulating columns and means for supporting them in spaced relation, a fixed switch contact supported on each of said columns, a movable column carrying a cross bar for bridging the space between said fixed columns and the switch contacts thereon, movable switch contacts mounted on opposite ends of said cross bar for engagement with said fixed contacts, a rotatable shaft, and means responsive to rotation of said shaft for rotating said movable column about an axis extending substantially perpendicularly through its base to cause said cross bar to move in the arc of a circle with said movable switch contacts thereon moving in identical direction to a position above said fixed switch contacts and for then lowering said column and cross bar to cause said movable switch contacts to engage said fixed switch contacts.

2. In a high tension switch, a pair of fixed switch contacts, means for supporting said contacts in spaced relation, a pair of movable switch contacts, means for supporting said movable contacts out of engagement with said fixed contacts, and mechanism for actuating said second supporting means for moving said movable switch contacts in the arc of a circle to a position outside said fixed contacts and for then moving said movable contacts along a radius of the same circle and toward the center thereof to engage said fixed contacts.

3. In a high tension switch, the combination with an insulating column for supporting the movable member of a switch, of supporting means for said column comprising two spaced base members, a shaft rotatably mounted on the outside of the first one of said base members, a crank carried on said shaft and normally extending across and resting on said first base member, a link pivotally mounted on the outside of the second base member and normally extending across said second member and resting thereon, a bracket secured to the end of said column and positioned between said base members, and means for pivotally connecting the free ends of said crank and link to said bracket at different points, respectively.

4. In a high tension switch, the combination with an insulating column carrying the movable switch member, of supporting means for said column comprising a bracket to which the base of said column is secured, a link and a crank each having one end pivotally secured to said bracket, means pivotally supporting the other ends of the link and crank including a rotatable shaft on which the crank is mounted, and two rigid fixed surfaces on which the link and crank are normally supported, respectively, at points intermediate of their ends.

5. In a high tension switch, the combination with an insulating column carrying the movable switch member, of means for supporting said column comprising a bracket to which the base of said column is secured, a rotatable shaft carrying a crank, means pivotally connecting the free end of said crank to the said bracket, a link having one end pivoted at a point outside the arc described by movement of the end of said crank, and means pivotally connecting the free end of said link to said bracket at a point between the base of said column and the point at which the end of said crank is connected.

6. In a high tension switch, the combination with an insulating column carrying the movable switch member, of means for supporting and moving said column comprising a base member to which the column is secured, a rotatable shaft carrying a crank having its free end pivoted to said member, and a link also pivoted to said member at one end and to a fixed support at the other, said shaft, crank, and link, and their respective pivot points being so arranged that upon the initial rotation of the shaft the crank will cause an axial movement of the column in a direction away from the supporting means while upon further rotation of the shaft the crank will rotate the column about the point at which the said member is pivoted to said link.

7. In a high tension switch, two fixed rigidly mounted switch members spaced apart and having semi-circular inner contact surfaces, a cross member having fixed semi-circular outer contact surfaces at opposite ends thereof, movable supporting means for said cross member adapted to move the same to bring about partial engagement between the contact surfaces on said cross member and the contact surfaces on said switch members, and ancillary means included in said supporting means of said cross member for bringing said fixed contact surfaces thereon in complete engagement with said fixed contact members and at the same time causing a relative frictional rotation between them.

8. In a high tension switch, two fixed switch members spaced apart and having fixed semi-circular contact surfaces both opening in the same direction, a cross member having semi-circular contact surfaces at opposite ends adapted to cooperate with said fixed contact surfaces, supporting means for said cross member adapted to rotate the same in the arc of a circle to cause the contact surfaces thereon to partially enter and engage said fixed contact surfaces, and means responsive to further operation of said supporting means to increase the radius of rotation of said cross member to bring the contact surfaces thereon within and into complete engagement with said fixed contact surfaces.

9. In a high tension switch, two fixed spaced switch contacts, a cross bar having a pair of resilient contact fingers at opposite ends thereof, and means for moving said bar toward said switch contacts in the arc of a circle with said contact fingers moving in identical direction to bring one contact finger of each pair into engagement with said fixed switch contacts, respectively, said means including a movable support with bearings on which said cross bar is rotatable, whereby further movement of the bar in the same direction causes the engaged contact fingers to rotate the bar and bring the other contact fingers into engagement with said switch contacts.

10. In a high tension switch, two fixed oppositely disposed switch contacts supported on spaced insulating columns and lying in spaced relation to each other in a straight line plane, an intermediate column rotatably supported at its lower end and means to rotate said column through a plane intersecting the plane of said switch contacts, a cross bar mounted at the top of said intermediate column and being rotatable around its own axis, switch contacts at opposite ends of said bar adapted to cooperate with said oppositely disposed fixed contacts, respectively, and means for causing the switch contacts on said bar to engage said fixed switch contacts responsive to rotation of said intermediate column and rotation of said bar.

11. In a high tension switch, supporting means for the movable switch contacts comprising a column pivoted at one end, a cross bar on which said switch contacts are secured at the opposite ends thereof, respectively, and bearings at the free end of said column in which said cross bar is rotatable around its own axis.

12. In a high tension switch, supporting means for the movable switch contacts comprising a cross bar to which said switch contacts are fixed, an insulating column having a bearing member at one end in which said cross bar is rotatable around its own axis, spring means tending to rotate said cross bar in said bearing member, and stop means for limiting rotation in one direction to maintain said spring under tension.

13. In a high tension switch, supporting means for the movable switch contacts comprising an insulating column pivoted at one end, a cross bar on which said switch contacts are secured, means for mounting said cross bar at the free end of said column so that it is rotatable around its own axis, stop means for limiting the rotation of said cross bar in both directions, and a spring for maintaining the bar rotated to the limit in one direction.

WELDON O. HAMPTON.